United States Patent
Antaya

(10) Patent No.: US 10,773,324 B2
(45) Date of Patent: Sep. 15, 2020

(54) RESISTANCE SOLDERING APPARATUS AND METHOD OF USING THE SAME

(71) Applicant: Antaya Technologies Corporation, Warwick, RI (US)

(72) Inventor: Stephen C. Antaya, West Kingston, RI (US)

(73) Assignee: Antaya Technologies Corporation, Warwick, RI (US)

( * ) Notice: Subject to any disclaimer, the term of this patent is extended or adjusted under 35 U.S.C. 154(b) by 364 days.

(21) Appl. No.: 15/723,290

(22) Filed: Oct. 3, 2017

(65) Prior Publication Data

US 2018/0099343 A1      Apr. 12, 2018

Related U.S. Application Data

(60) Provisional application No. 62/405,527, filed on Oct. 7, 2016.

(51) Int. Cl.
| | | |
|---|---|---|
| *B23K 1/00* | (2006.01) | |
| *B60J 1/00* | (2006.01) | |
| *B23K 3/02* | (2006.01) | |
| *B23K 3/03* | (2006.01) | |
| *B23K 101/42* | (2006.01) | |

(52) U.S. Cl.
CPC .......... *B23K 1/0004* (2013.01); *B23K 1/0016* (2013.01); *B23K 3/025* (2013.01); *B23K 3/03* (2013.01); *B60J 1/002* (2013.01); *B23K 2101/42* (2018.08)

(58) Field of Classification Search
CPC ...... B23K 1/19; B23K 35/02; B23K 35/0205; B23K 35/0222; B23K 35/0227; B23K 35/022; B23K 35/22
USPC ................ 219/140, 9, 22, 2, 85, 86, 91
See application file for complete search history.

(56) References Cited

U.S. PATENT DOCUMENTS

| | | | |
|---|---|---|---|
| 6,089,442 A | 7/2000 | Ouchi et al. | |
| 6,253,988 B1 | 7/2001 | Pereira | |
| 2015/0053654 A1* | 2/2015 | Sigler | B23K 11/20 219/87 |

(Continued)

FOREIGN PATENT DOCUMENTS

| | | |
|---|---|---|
| EP | 1631411 A1 | 3/2006 |
| EP | 3199286 A1 * | 8/2017 |

(Continued)

*Primary Examiner* — Ibrahime A Abraham
*Assistant Examiner* — Dilnessa B Belay
(74) *Attorney, Agent, or Firm* — Billion & Armitage; Robert Myers

(57) ABSTRACT

A resistance soldering apparatus suited for soldering an electrical terminal to a glass surface and a method of using such an apparatus is described herein. The resistance soldering apparatus includes an electrode having a distal tip and an electrical terminal having a first major surface in which an indentation is defined and a second major surface opposite the first major surface on which a layer of a solder composition is disposed. The indentation is configured to receive the distal tip of the electrode. The distal tip of the electrode is placed within the indentation and an electrical current is passed through the electrode and the electrical terminal, The electrical current is sufficient to heat the electrode and melt the solder composition on the second major surface.

26 Claims, 4 Drawing Sheets

(56) References Cited

U.S. PATENT DOCUMENTS

2015/0296615 A1    10/2015    Schmalbuch et al.

FOREIGN PATENT DOCUMENTS

| EP | 3199286 A1 | | 8/2017 | |
| GB | 1300809 A | * | 12/1972 | ........... B23K 11/248 |
| JP | S5378955 A | | 7/1978 | |
| JP | 2016506020 A | | 2/2016 | |
| JP | 2016064444 A | | 4/2016 | |
| WO | 2004103628 A1 | | 12/2004 | |
| WO | WO-2016047733 A1 | * | 3/2016 | ............... B23K 1/00 |

* cited by examiner

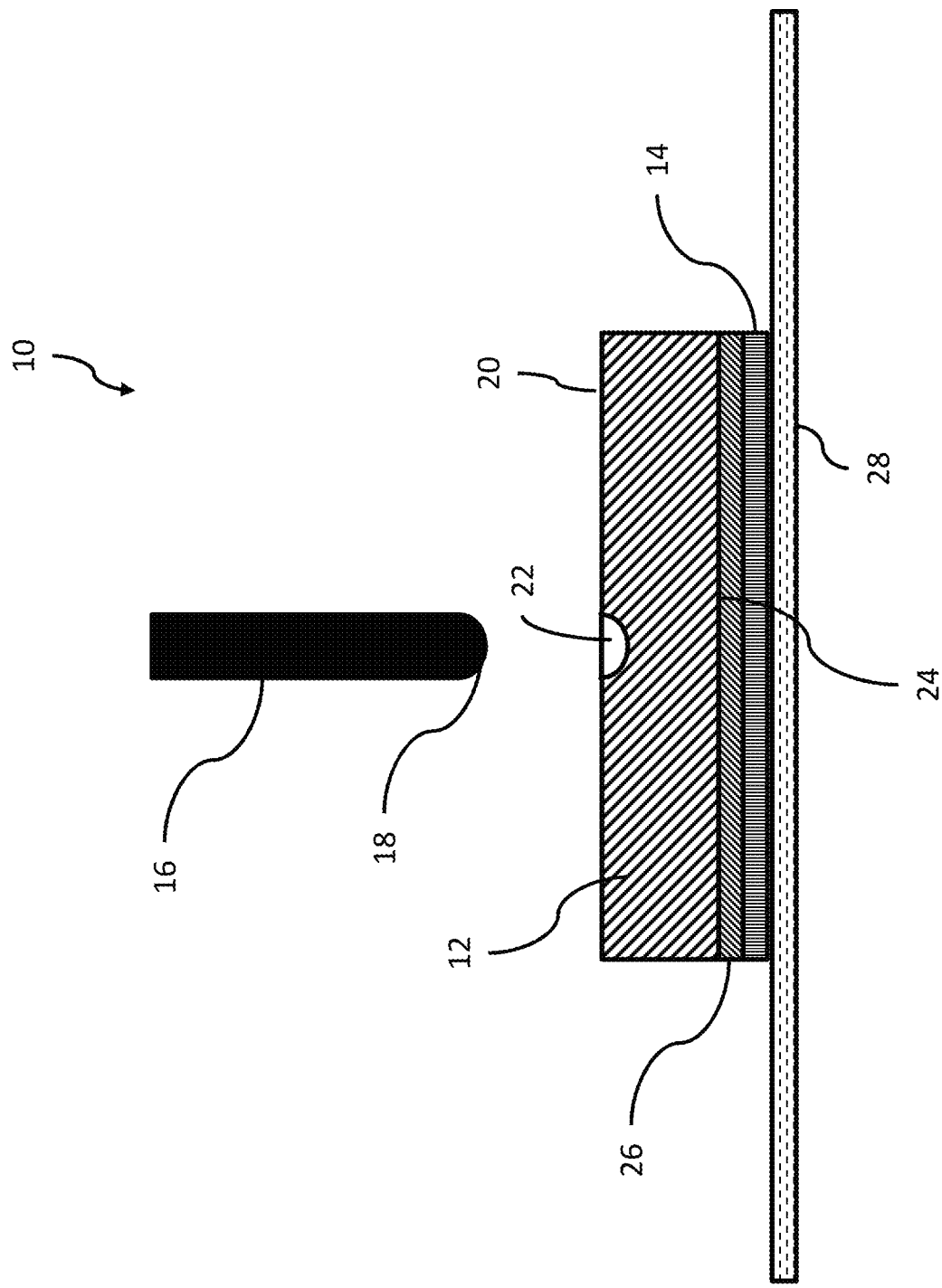

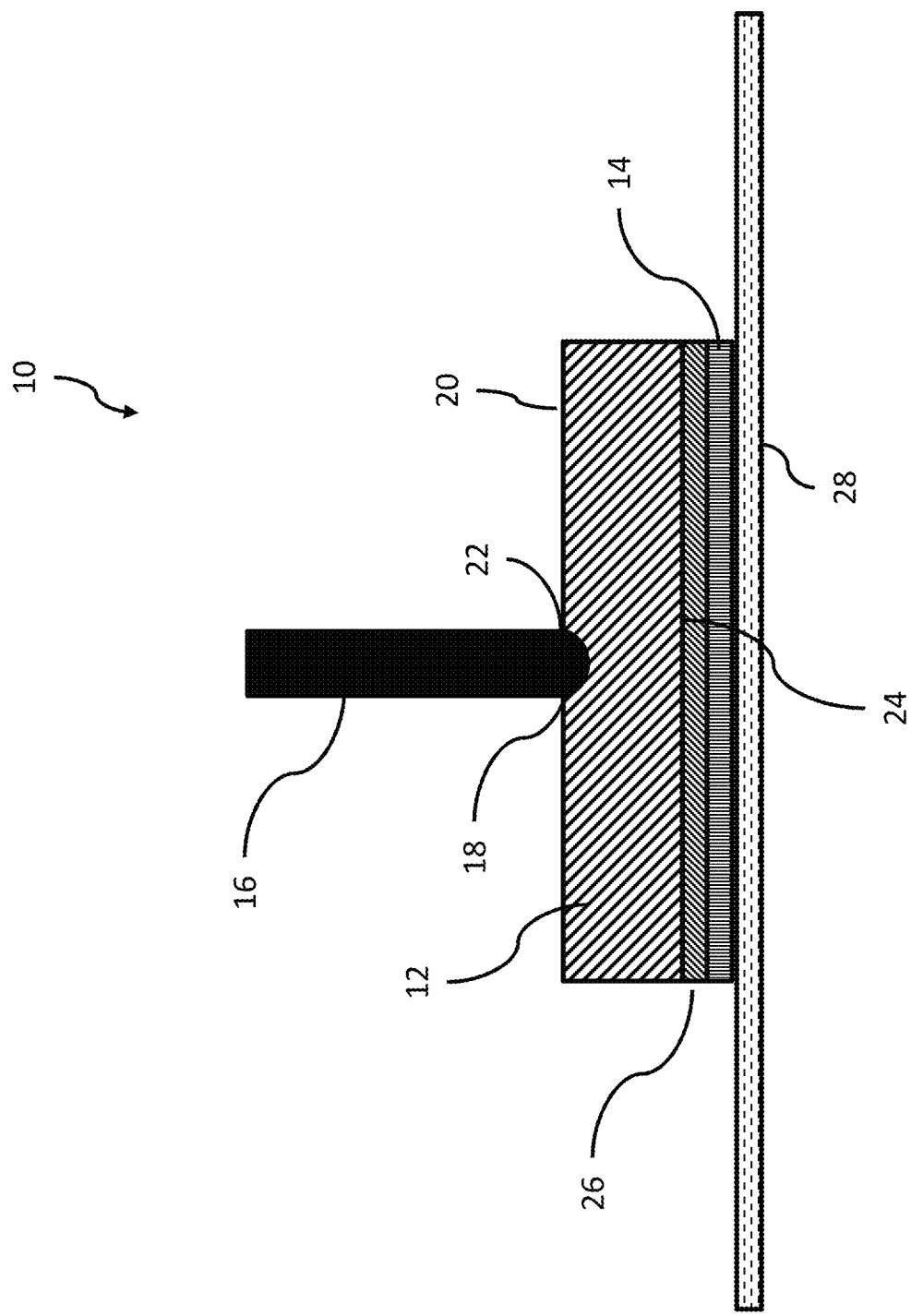

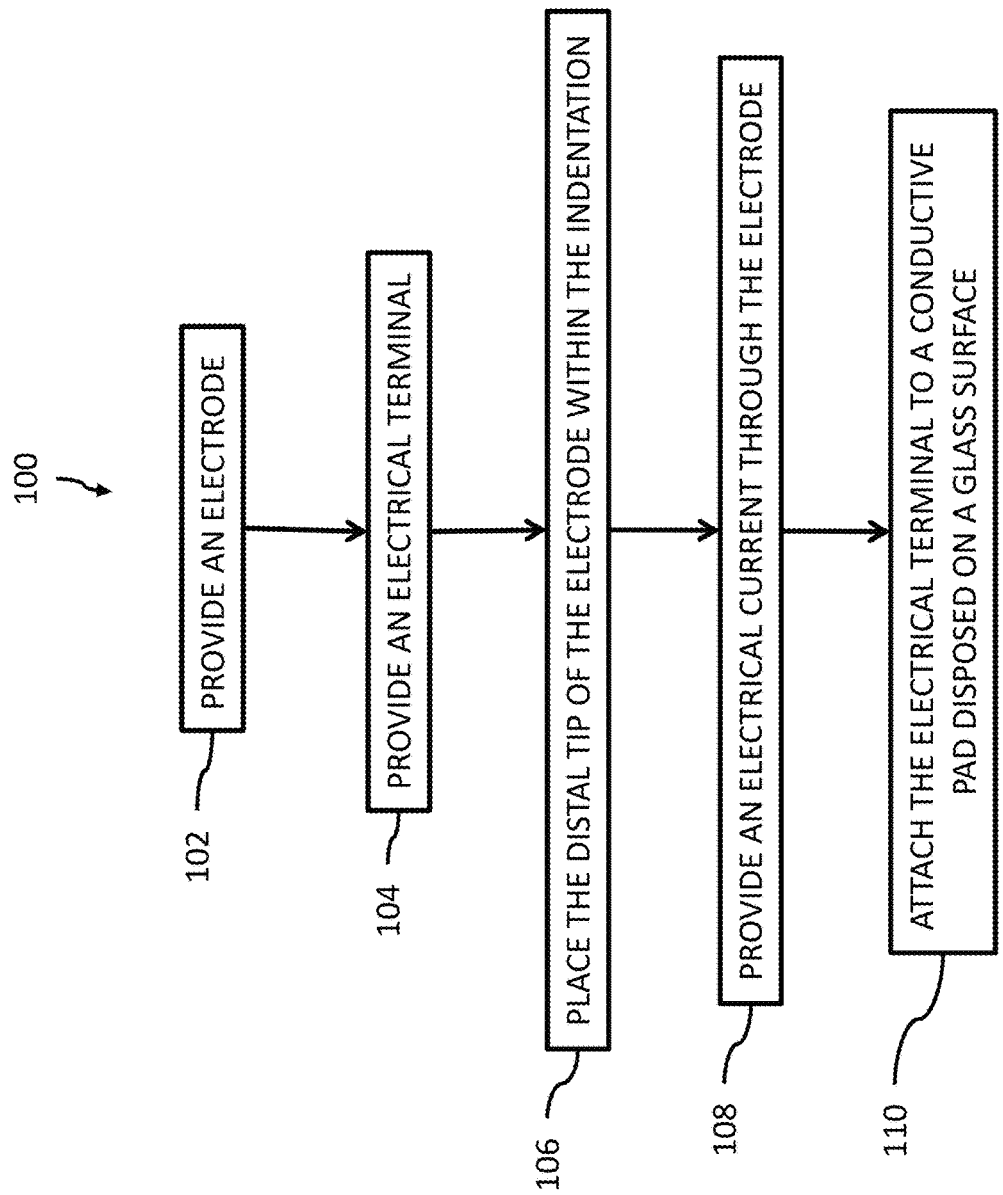

RESISTANCE SOLDERING APPARATUS AND METHOD OF USING THE SAME

CROSS-REFERENCE TO RELATED APPLICATION

This application claims the benefit under 35 USC § 119(e) of U.S. Provisional Patent Application No. 62/405,527 filed on Oct. 7, 2016, the entire disclosure of which is hereby incorporated by reference.

TECHNICAL FIELD OF THE INVENTION

The invention generally relates to a resistance soldering, and more particularly relates to a resistance soldering apparatus and method having an electrode and terminal particularly suited for attaching a metallic component, such as an electrical terminal to a conductive pad printed on a glass surface.

BACKGROUND OF THE INVENTION

Resistance solder is a process of heating a solder by passing an electrical current through a resistive electrode. This process has been used to solder electrical terminals to electrically conductive pads printed on glass surfaces. Any gaps or point contacts between the electrode and the electrical terminal can change the electrical and thermal characteristics of the connection between the electrode and terminal that can negatively affect the soldering process. Therefore, a resistance soldering apparatus that eliminates these gaps and point contacts in order to provide a more consistent soldering process is desired.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

According to an embodiment of the invention a resistance soldering apparatus is provided. The resistance soldering apparatus includes an electrode having a distal tip and an electrical terminal having a first major surface in which an indentation is defined and a second major surface opposite the first major surface on which a layer of a solder composition is disposed. The indentation is configured to receive the distal tip of the electrode.

The distal tip may be characterized as having a convex shape and the indentation may be characterized as having a corresponding concave shape. The electrode may have a generally cylindrical shape and the distal tip may be characterized as having a convex spherical cap shape. The indentation may be characterized as having a concave spherical cap shape. The distal tip may be characterized as having a convex hemispherical shape and wherein the indentation is characterized as having a concave hemispherical shape.

A radius of the convex spherical cap shape may be substantially equal to a radius of the concave spherical cap shape. A diameter of the convex spherical cap shape may be larger than a diameter of the concave spherical cap shape.

The electrode may be formed of a carbon-based material and the electrical terminal may be formed of a copper-based material. The solder composition may be substantially lead-free.

The apparatus may be configured to attach the electrical terminal to a conductive pad disposed on a glass surface.

According to another embodiment of the invention a method of resistance soldering is provided. The method includes the steps of providing an electrode having a distal tip and providing an electrical terminal having a first major surface in which an indentation is defined and a second major surface opposite the first major surface on which a layer of a solder composition is disposed. The method further includes the steps of placing the distal tip of the electrode within the indentation and providing an electrical current through the electrode and the electrical terminal. The current is sufficient to heat the electrode and melt the solder composition on the second major surface.

The distal tip may be characterized as having a convex shape and the indentation may be characterized as having a corresponding concave shape. The electrode may have a generally cylindrical shape and the distal tip may be characterized as having a convex spherical cap shape. The indentation may be characterized as having a concave spherical cap shape. The distal tip may be characterized as having a convex hemispherical shape and wherein the indentation is characterized as having a concave hemispherical shape.

A radius of the convex spherical cap shape may be substantially equal to a radius of the concave spherical cap shape. A diameter of the convex spherical cap shape may be larger than a diameter of the concave spherical cap shape.

The electrode may be formed of a carbon-based material and the electrical terminal may be formed of a copper-based material. The solder composition may be substantially lead-free.

The method may further include the step of attaching the electrical terminal to a conductive pad disposed on a glass surface. The glass surface may be formed of laminated glass.

Further features and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which:

FIG. 2 is a side view of the resistance soldering apparatus of FIG. 1 in accordance with one embodiment;

FIG. 3 is an alternative side view of the resistance soldering apparatus of FIG. 1 with an electrode received within an indentation in an electrical terminal in accordance with one embodiment; and FIG. 4 is a flow chart illustrating a process of using the resistance soldering apparatus of FIG. 1 in accordance with another embodiment.

DETAILED DESCRIPTION OF THE INVENTION

Figure 1:
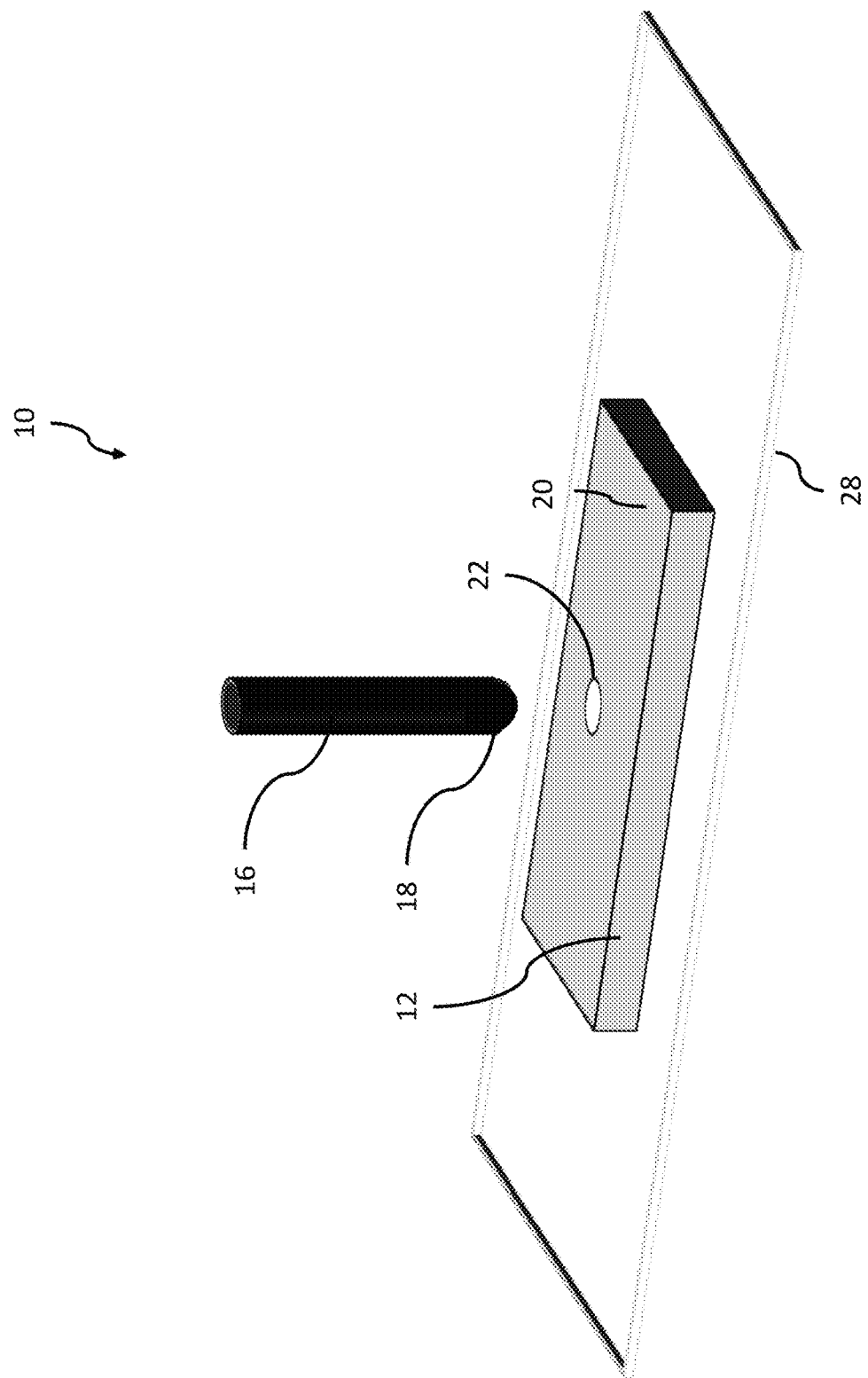
FIG. 1 is an exploded perspective view of a resistance soldering apparatus in accordance with one embodiment.

A resistance soldering device is described herein. This device is suited for soldering electrical terminals to conductive pads printed on glass, such as those used for on-glass antennae and rear window defrosters in automobiles. This resistance soldering device is particularly well suited for use on a laminated glass work piece.

Resistance soldering uses a resistive electrode through which an electric current is passed to provide a heat source for soldering. The inventor has discovered that the electrical contact interface between the electrode and the electrical terminal being soldered can have a negative impact on the quality of the resulting soldered joint if there are any gaps or isolated points of contact between the electrode and the terminal that may cause arcing or intermittent contact between the electrode and the electrical terminal. Therefore, the inventor has found a solution to provide more even and complete surface contact between the electrode and the electrical terminal.

FIGS. 1 through 3 show a non-limiting example of a resistance soldering device 10 that may be used to solder an electrical terminal 12 to a conductive pad 14. The resistance soldering device 10 includes a resistive electrode 16 formed of an electrically resistive material, such as graphite. The electrode 16 is generally cylindrical having a distal tip 18 that may be characterized as a convex spherical cap shape, in this particular example; the distal tip 18 has a generally hemispherical shape. The electrical terminal 12 is formed of a metallic material, such as a copper-based alloy. The electrical terminal 12 has a first major surface 20 in which a concave spherical cap shaped indentation 22 corresponding to the shape of the distal tip 18 of the electrode 16 is defined in this particular example; the indentation 22 has a generally hemispherical shape. As shown in FIGS. 2 and 3, the electrical terminal 12 further has a second major surface 24 that is opposite the first major surface 20 on which a solder layer 26, such as a lead-free indium-based solder is disposed. As shown in FIGS. 2 and 3, the indentation 22 in the first major surface 20 is configured to receive the distal tip 18 of the electrode 16. A radius of the convex spherical cap shape of the distal tip 18 is substantially equal to a radius of the concave spherical cap shape of the indentation 22 in the electrical terminal 12, thereby reducing or eliminating any gaps or isolated points of contact between the electrode 16 and the electrical terminal 12. As used herein, "substantially equal" means the measurements of the radii differ by less than 0.5 millimeters. The diameter of the indentation 22 is preferably slightly larger than the diameter of the electrode 16 to allow easier insertion and removal of the electrode 16 from the indentation 22.

As shown in FIGS. 2 and 3, the electrical terminal 12 is placed on a conductive pad 14, such as a silver-based ink, printed on a surface of a laminated glass work piece 28. The position of the electrode 16 and/or the glass work piece 28 are adjusted until the distal tip 18 is received within the indentation 22 and the surface of the distal tip 18 is in contact with the surface of the indentation 22 as shown in FIG. 3.

After the electrode 16 and electrical terminal 12 are in contact, an electrical current is passed thought the electrode 16, heating the electrode 16 sufficiently to melt the solder layer 26 on the second major surface 24 of the electrical terminal 12 and form a solder joint between the electrical terminal 12 and the conductive pad 14.

While the illustrated embodiments include a cylindrical electrode 16 having a convex spherical cap shaped distal tip 18 and an electrical terminal 12 having a corresponding concave spherical cap shaped indentation 22, other embodiments of the invention may be envisioned that have an electrode with another convex shaped tip and a terminal with another corresponding concave indentation that reduce or eliminate any gaps or isolated points of contact between the electrode and the terminal. Still other embodiments may be envisioned in which the electrode has a concave shaped tip and the terminal defines a corresponding convex projection that is received within the concave tip.

Further, while the illustrated embodiments include an electrode 16 formed of a carbon-based material and an electrical terminal 12 that is formed of a copper-based material, other embodiments may be envisioned in which other resistive materials are used to form the electrode and other conductive materials are used to form the terminal.

Additionally, while the illustrated embodiments are used to attach an electrical terminal 12 to a glass work piece 28, other embodiments may be envisioned for many other resistive soldering applications.

A non-limiting example of a method 100 of resistance soldering is presented in FIG. 4. The steps of this method 100 are described below:

STEP 102, PROVIDE AN ELECTRODE includes providing an electrode 16 having a distal tip 18 as shown in FIG. 1-3. The electrode 16 preferably has a generally cylindrical shape and the distal tip 18 has a convex shape, preferably a convex spherical cap shape, and more preferably a convex hemispherical shape. A radius of the convex spherical cap shape is substantially equal to a radius of the concave spherical cap shape. A diameter of the convex spherical cap shape is smaller than a diameter of the concave spherical cap shape. The electrode 16 is preferably formed of a carbon-based material;

STEP 104, PROVIDE AN ELECTRICAL TERMINAL, includes providing an electrical terminal 12 having a first major surface 20 in which an indentation 22 is defined and a second major surface 24 opposite the first major surface 20 on which a solder layer 26 is disposed as shown in FIGS. 2 and 3. The indentation 22 has a concave spherical cap shape, preferably having a concave hemispherical shape. The electrical terminal 12 is preferably formed of a copper-based material. The solder layer is preferably substantially lead-free.

STEP 106, PLACE THE DISTAL TIP OF THE ELECTRODE WITHIN THE INDENTATION, includes placing the distal tip 18 of the electrode 16 within the indentation 22 as shown in FIG. 3;

STEP 108, PROVIDE AN ELECTRICAL CURRENT THROUGH THE ELECTRODE, includes providing an electrical current through the electrode 16 and the electrical terminal 12. The electrical current is sufficient to heat the electrode 16 to a temperature that will melt the solder layer 26 on the second major surface 24; and STEP 110, ATTACH THE ELECTRICAL TERMINAL TO A CONDUCTIVE PAD DISPOSED ON A GLASS SURFACE, includes attaching the electrical terminal 12 to a conductive pad 14 disposed on a glass work piece 28. The glass work piece 28 may be formed of laminated glass.

Accordingly, a resistance soldering device 10 and a method 100 of resistance soldering is provided. The resistance soldering device 10 and the method 100 provide the benefit of eliminating gaps or point contacts between the electrode 16 and the electrical terminal 12. The gaps or point contacts may negatively affect the electrical and thermal conductivity between the electrode 16 and the electrical terminal 12, which can alter the soldering temperature and negatively affect the strength of the solder bond between the electrical terminal 12 and the conductive pad 14 or provide uneven heating of the electrical terminal 12 that could crack the glass work piece 28.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

In the following claims, the terms "including" and "in which" are used as the plain-English equivalents of the respective terms "comprising" and "wherein." Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items. Additionally, directional terms such as upper, lower, etc. do not denote any particular orientation, but rather the terms upper, lower, etc. are used to distinguish one element from another and locational establish a relationship between the various elements.

Further, the limitations of the following claims are not written in means-plus-function format and are not intended to be interpreted based on 35 USC § 112(f), unless and until such claim limitations expressly use the phrase "means for" followed by a statement of function void of further structure.

I claim:

1. A resistance soldering apparatus, comprising:
an electrode having a distal tip; and
an electrical terminal having a planar first surface in which an indentation is defined and a second surface arranged opposite the first surface on which a layer of a solder composition is disposed, wherein the indentation in the first surface is configured to receive the distal tip of the electrode, wherein the distal tip is characterized as having a convex shape, wherein the indentation is characterized as having a concave shape corresponding to the convex shape of the distal tip, and wherein the indentation is integrally formed in the first surface.

2. The resistance soldering apparatus in accordance with claim 1, wherein the electrode has a generally cylindrical shape and the distal tip is characterized as having a convex spherical cap shape and wherein the indentation is characterized as having a concave spherical cap shape.

3. The resistance soldering apparatus in accordance with claim 2, wherein a radius of the convex spherical cap shape is less than a radius of the concave spherical cap shape.

4. The resistance soldering apparatus in accordance with claim 3, wherein a diameter of the convex spherical cap shape is smaller than a diameter of the concave spherical cap shape.

5. The resistance soldering apparatus in accordance with claim 3, wherein the distal tip is characterized as having a convex hemispherical shape and wherein the indentation is characterized as having a concave hemispherical shape.

6. The resistance soldering apparatus in accordance with claim 1, wherein the electrode is formed of a carbon-based material.

7. The resistance soldering apparatus in accordance with claim 1, wherein the electrical terminal is formed of a copper-based material.

8. The resistance soldering apparatus in accordance with claim 1, wherein the solder composition is lead-free.

9. The resistance soldering apparatus in accordance with claim 1, wherein the resistance soldering apparatus is configured to attach the electrical terminal to a conductive pad disposed on a glass surface.

10. The resistance soldering apparatus in accordance with claim 1, wherein the first surface is consistently planar.

11. The resistance soldering apparatus in accordance with claim 1, wherein the indentation is defined in a central region of the first surface.

12. The resistance soldering apparatus in accordance with claim 1, wherein the indentation and the distal tip are sized, shaped, and arranged to eliminate any gaps or isolated points of contact between the electrode and the terminal.

13. A method of resistance soldering, comprising the steps of:
providing an electrode having a distal tip;
providing an electrical terminal having a planar first surface in which an indentation is defined and a second surface arranged opposite the first surface on which a layer of a solder composition is disposed, wherein the indentation in the first surface is configured to receive the distal tip of the electrode, wherein the distal tip is characterized as having a convex shape, wherein the indentation is characterized as having a concave shape corresponding to the convex shape of the distal tip, and wherein the indentation is integrally formed in the first surface;
placing the distal tip of the electrode within the indentation; and
providing an electrical current through the electrode and the electrical terminal, wherein the electrical current is sufficient to heat the electrode and melt the solder composition on the second major surface.

14. The method in accordance with claim 13, wherein the electrode has a generally cylindrical shape and the distal tip is characterized as having a convex spherical cap shape and wherein the indentation is characterized as having a concave spherical cap shape.

15. The method in accordance with claim 14, wherein a radius of the convex spherical cap shape is less than a radius of the concave spherical cap shape.

16. The method in accordance with claim 15, wherein a diameter of the convex spherical cap shape is smaller than a diameter of the concave spherical cap shape.

17. The method in accordance with claim 15, wherein the distal tip is characterized as having a convex hemispherical shape and wherein the indentation is characterized as having a concave hemispherical shape.

18. The method in accordance with claim 13, wherein the electrode is formed of a carbon-based material.

19. The method in accordance with claim 13, wherein the electrical terminal is formed of a copper-based material.

20. The method in accordance with claim 13, wherein the solder composition is lead-free.

21. The method in accordance with claim 13, wherein the method further comprises the step of attaching the electrical terminal to a conductive pad disposed on a glass surface, wherein the glass surface is formed of laminated glass.

22. The resistance soldering apparatus in accordance with claim 10, wherein the second surface is consistently planar and substantially parallel to the first surface.

23. The method in accordance with claim 13, wherein the first surface is consistently planar.

24. The method in accordance with claim 23, wherein the second surface is consistently planar and substantially parallel to the first surface.

25. The method in accordance with claim 13, wherein the indentation is defined in a central region of the first surface.

26. The method in accordance with claim 13, wherein the indentation and the distal tip are sized, shaped, and arranged to eliminate any gaps or isolated points of contact between the electrode and the terminal.

* * * * *